United States Patent
Alrabady et al.

(10) Patent No.: US 7,778,213 B2
(45) Date of Patent: Aug. 17, 2010

(54) METHOD AND SYSTEM FOR SELECTIVELY COMMUNICATING WITH MOBILE PLATFORMS

(75) Inventors: Ansaf I. Alrabady, Livonia, MI (US); Karin L. Turski, Rochester Hills, MI (US); Michael Jay Abowd, Ann Arbor, MI (US); Fred W. Huntzicker, Ann Arbor, MI (US); David T. Proefke, Madison Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 713 days.

(21) Appl. No.: 11/678,074

(22) Filed: Feb. 23, 2007

(65) Prior Publication Data

US 2008/0205320 A1 Aug. 28, 2008

(51) Int. Cl.
*H04H 20/71* (2008.01)
*H04B 1/034* (2006.01)
*H04M 1/00* (2006.01)

(52) U.S. Cl. ............... 370/312; 455/99; 455/569.2; 455/575.9

(58) Field of Classification Search ........... 455/99, 455/569.2, 575.9; 370/312
See application file for complete search history.

(56) References Cited

U.S. PATENT DOCUMENTS

| | | | |
|---|---|---|---|
| 5,751,073 A | 5/1998 | Ross | |
| 5,781,871 A * | 7/1998 | Mezger et al. | 455/424 |
| 6,397,149 B1 * | 5/2002 | Hashimoto | 701/300 |
| 6,577,934 B2 | 6/2003 | Matsunaga et al. | |
| 6,668,157 B1 * | 12/2003 | Takeda et al. | 455/11.1 |
| 6,687,587 B2 | 2/2004 | Kacel | |
| 6,718,470 B1 | 4/2004 | Adams | |
| 6,944,528 B2 | 9/2005 | Nagano | |
| 7,010,402 B2 | 3/2006 | Flick | |
| 7,031,717 B2 | 4/2006 | Mazzara | |
| 7,091,822 B2 | 8/2006 | Flick et al. | |
| 7,093,298 B2 | 8/2006 | Rodriquez et al. | |
| 7,113,127 B1 | 9/2006 | Banet et al. | |
| 7,119,709 B2 | 10/2006 | Magner et al. | |
| 7,126,926 B1 | 10/2006 | Bjorklund et al. | |
| 2002/0035429 A1 | 3/2002 | Banas | |
| 2003/0120395 A1 | 6/2003 | Kacel | |
| 2003/0147534 A1 | 8/2003 | Ablay et al. | |
| 2003/0203716 A1 * | 10/2003 | Takahashi et al. | 455/11.1 |
| 2004/0044454 A1 | 3/2004 | Ross et al. | |
| 2004/0157650 A1 | 8/2004 | Wissinger et al. | |
| 2005/0132024 A1 | 6/2005 | Habaguchi et al. | |
| 2007/0250220 A1 * | 10/2007 | Hunt et al. | 701/1 |

FOREIGN PATENT DOCUMENTS

EP 1699031 A1 9/2006
JP 2001-094457 A 4/2001

* cited by examiner

*Primary Examiner*—George Eng
*Assistant Examiner*—Chayce Bibbee

(57) ABSTRACT

There is provided a method for selectively communicating from a remote system to a subset of a plurality of vehicles. Each of the vehicles is equipped with a first wireless communications device and a second wireless communication device. The method comprises broadcasting a common message from the remote system to the vehicles via the first wireless communication device. A subset of the plurality of vehicles is selected based upon the common message. A communications link is established between the remote system and the second wireless communication device of each of the selected subset of vehicles to transmit formatted electronic data therebetween.

13 Claims, 1 Drawing Sheet

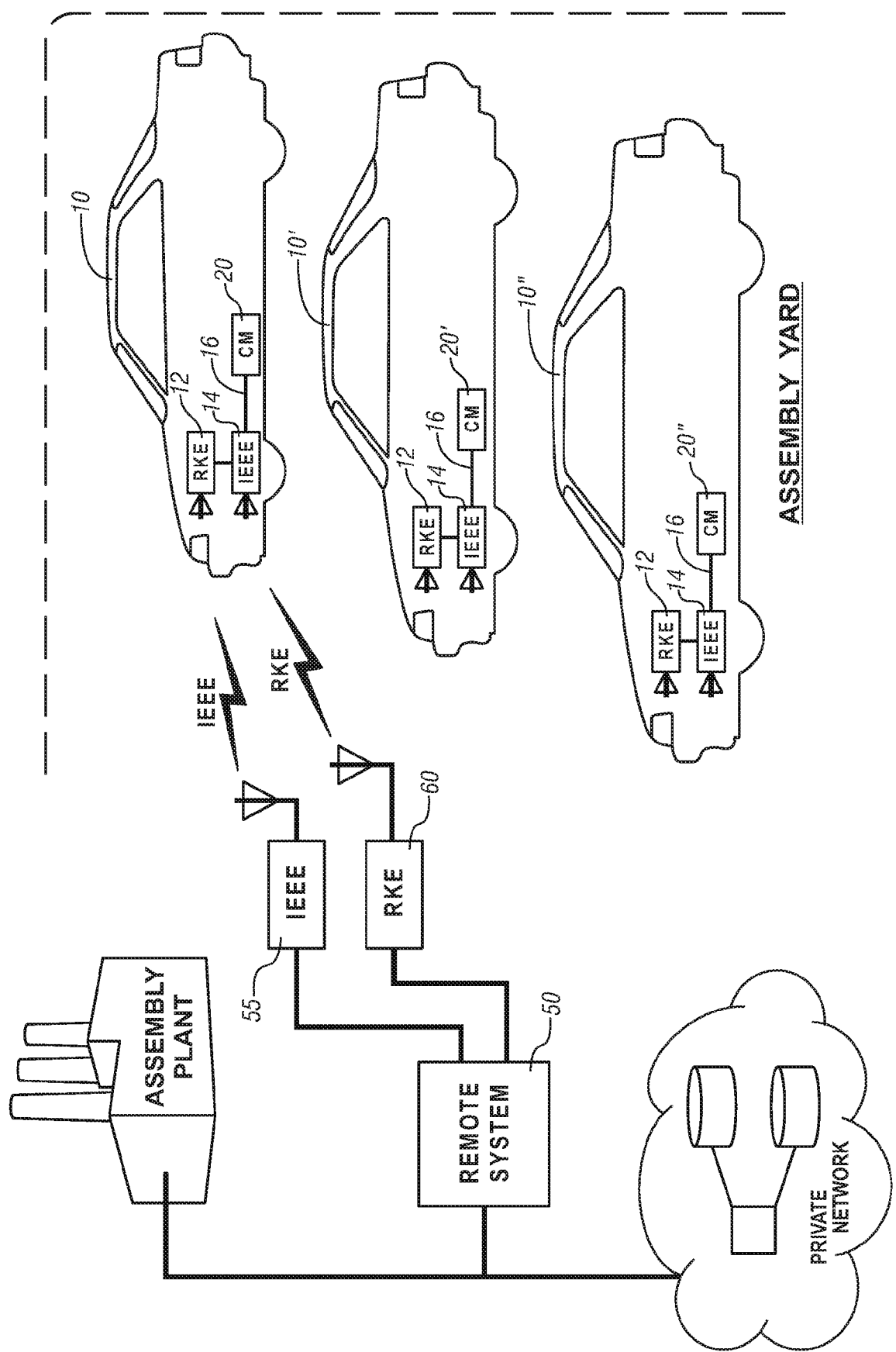

METHOD AND SYSTEM FOR SELECTIVELY COMMUNICATING WITH MOBILE PLATFORMS

TECHNICAL FIELD

This invention pertains generally to mobile platforms and more specifically to wireless communications thereto.

BACKGROUND OF THE INVENTION

The statements in this section merely provide background information related to the present disclosure and may not constitute prior art.

There is a growing application of wireless communication services for motor vehicles, to provide features including navigation and audio/audio-visual media during operation of the mobile platform, and to enhance vehicle management and communications. Current communications systems typically comprise point-to-point communications, e.g., cellular systems, which typically operate at a low data bandwidth. Other systems comprise XM satellite radio systems, which use geostationary satellites to communicate music, news and audio entertainment to mobile platforms, typically operating at low data bandwidth, with a national distribution.

A wireless system operates most effectively when it is constantly activated. However, wireless communication consumes electrical energy and can drain a battery. Furthermore, there may be a plethora of remote wireless devices attempting to communicate with the wireless system of the vehicle, requiring the wireless receiver to verify each remote device prior to permitting access to communicate therewith. Therefore, it is preferable to deactivate the wireless receiver when the vehicle is shut off.

There may be a need to communicate with one or more vehicles parked in an assembly yard adjacent to a vehicle assembly plant, to upgrade data contained in memory devices prior to shipping the vehicles. This can include a plurality of vehicles, distinguishable based upon assembly dates, or vehicle model, or powertrain system, or other characteristics. Currently, a process for upgrading software on vehicles in an assembly yard comprises identifying specifically targeted vehicles and individually reprogramming each of the identified vehicles, which can be labor-intensive and time-consuming.

There is a need for a method and system for facilitating software upgrades on vehicles in an assembly yard which addresses the concerns described hereinabove. Such a system is described.

SUMMARY OF THE INVENTION

In accordance with an embodiment of the invention, there is provided a method for selectively communicating from a remote system to a subset of a plurality of vehicles. Each of the vehicles is equipped with a first wireless communications device and a second wireless communication device. The method comprises broadcasting a common message from the remote system to the vehicles via the first wireless communication device. A subset of the plurality of vehicles is selected based upon the common message. A communications link is established between the remote system and the second wireless communication device of each of the selected subset of vehicles to transmit formatted electronic data therebetween.

These and other aspects of the invention will become apparent to those skilled in the art upon reading and understanding the following detailed description of the embodiments.

BRIEF DESCRIPTION OF THE DRAWING

The invention may take physical form in certain parts and arrangement of parts, the preferred embodiment of which is described in detail and illustrated in the accompanying drawing which forms a part hereof, and wherein:

The FIGURE is a schematic diagram, in accordance with the present invention.

DETAILED DESCRIPTION OF THE EMBODIMENTS

Referring now to the drawing, wherein the showings are for the purpose of illustrating the invention only and not for the purpose of limiting the same, the FIGURE depicts a plurality of mobile platforms, e.g., vehicles, operative to communicate wirelessly with a remote system, which has been constructed in accordance with an embodiment of the present invention. Although three vehicles are depicted, it is understood that there can be a multiplicity of vehicles of various build configurations in the general proximity thereof. The vehicles 10, 10', 10'' each comprise a motor vehicle, e.g., an automobile, and as depicted are located in an assembly yard adjacent to a vehicle assembly plant, prior to being placed into commerce. Each of the vehicles 10, 10', 10'' is equipped with a first communications receiver 12 (hereinafter 'RKE receiver') and a second communications receiver 14 (hereinafter 'IEEE receiver'). There is a remote system 50 signally connected to a wireless access point ('IEEE') 55 and an RKE transmitter/broadcaster 60. The remote system 50 is operative to communicate wirelessly with each of the vehicles via the RKE receiver 12. Specific vehicles are selected based upon the communications through the RKE receiver 12, and these selected vehicles establish communications with the remote system through the wireless access point 55 and the IEEE receiver 14 under predetermined conditions, to transmit electronic data therebetween. The system, vehicles, and communications protocols are now described in greater detail.

The vehicles 10 as depicted comprise conventional passenger vehicles for use on public highways, and as shown are parked adjacent to the vehicle assembly plant, although the invention is not so limited. Each of the vehicles has a unique identification number, referred to as a VIN, which preferably provides information related to the vehicle manufacturer, vehicle attributes including engine and transmission configurations, model year, manufacturing plant, and a sequential serial number. For passenger vehicles, the VIN is described with reference to ISO standards 3779 and 3780, as known to one skilled in the art. Specific elements of each of the vehicles comprise the RKE receiver 12 and the IEEE receiver 14, a communications bus 16, and a control module ('CM') depicted as 20, 20', 20'' respectively. The control modules 20, 20', 20'' each preferably comprise one or more electronic control devices for controlling various operations the vehicle, and may be configured differently or may contain different operating and control algorithms, depending upon the vehicle configuration. Such differences include, but are not limited to, differences related to operating schemes for different engine configurations, operating schemes related to manual and automatic transmissions; and operating schemes related to two-wheel drive and four-wheel drive or all-wheel drive systems. All such vehicles may be assembled in a single assembly plant, having variations in the operating and control algorithms. The communications bus 16 comprises a conventional communications bus which facilitates communications of formatted electronic data between various electronic control devices and the IEEE receiver 14, including establishing and effecting a local area network between the electronic control devices on-board each of the vehicles. The electronic control devices comprise general or special purpose electronic devices operative to control various aspects of vehicle operation, including, e.g., powertrain control, suspension and brake control, and, climate control.

The RKE receiver ('RKE') 12 preferably comprises a conventional wireless communications receiver that has been adapted to provide remote keyless entry (RKE) functionality to the vehicle and having additional functionality as described. The RKE receiver 12 is signally connected to the IEEE receiver 14 via a cable or other connection. During normal vehicle operation, each RKE receiver 12 is adapted to receive and authenticate wireless signals, typically in the form of pulsed radio-frequency energy at a particular frequency, transmitted from a low-power portable transponder device, e.g., a key fob (not shown) that is unique to the individual vehicle, even during periods when the mobile platform is shut down in a key-off mode. Typically, communication to the RKE receiver 12 occurs at a wireless carrier frequency of 315 MHz utilizing amplitude shift keying (ASK) modulation. A data stream for the wireless signal to the RKE receiver 12 is typically 64 to 128 bits long, including a preamble, and a command code. The transmission rate is in the range of 2 to 20 kHz. Under normal vehicle operation, the RKE receiver 12 responds to a signal input from the portable transponder device as it is operated by the vehicle operator. The transponder device typically has a plurality of buttons which are depressible by the operator to command one or more of the following functions: lock and unlock vehicle entry doors; unlatch a vehicle trunk; open and close a sliding door or tailgate, and provide a vehicle alarm system by activating vehicle lights and horn.

The IEEE receiver 14 preferably comprises a known telematics unit and a signal demodulator operative to capture and interpret incoming signals, and communicate signals to the remote system 50. The incoming signals typically comprise formatted electronic data, as described hereinafter. A demodulator and memory storage manager (not shown) are signally connected to the IEEE receiver 14 and employed to capture incoming signals from the IEEE access point 55, and decrypt, tune, and recover the information and data sent thereto. The memory storage manager communicates the formatted electronic data to the control module 20 at appropriate times. When the vehicle is shutdown, e.g., parked with ignition key-off, the IEEE receiver 14 is shutdown and drawing minimal electrical current. When the IEEE receiver 14 is shutdown, it has minimal functionality, primarily comprising an ability to respond to an activation signal transmitted from the RKE receiver 12. The IEEE receiver 14 activates for a period of time after the activation signal, and operates to establish a wireless communications link with the remote system 50. The memory storage manager preferably is operably connected to embedded and removable storage devices to provide data storage. The memory storage manager structures and provides data storage. The telematics unit is adapted to execute known communications protocols to provide two-way wireless communications with remote devices, including but not limited to the IEEE access point 55 of the remote system 50. The communications protocols comprise any one of various known protocols, including, e.g., those compliant with IEEE 802.11 Wireless Networking standard, typically operating at 2.4 GHz and capable of communicating 1 megabit per second (Mbit/sec) of information.

The remote system 50 preferably comprises a conventional stand-alone computer equipped with and adapted to communicate with vehicles 10, 10', and 10". The remote system 50 may be connected to other computer devices via a local area network, e.g., a private network, or alternatively, the public Internet. The remote system 50 is signally connected to wireless IEEE access point 55 and RKE transmitter/broadcaster 60 to communicate wirelessly with the vehicles via the RKE receiver 12 and the IEEE receiver 14 under predetermined conditions, to transmit electronic data therebetween. The RKE transmitter/broadcaster 60 comprises a device operative to broadcast a common electronic message that can be received and interpreted by the RKE receiver 12, and is preferably consistent with the previously described signal input from the portable transponder device. Thus, in the embodiment described, the common message is a data stream that is 64 to 128 bits long, including a preamble and data code transmitted at a wireless carrier frequency of 315 MHz utilizing amplitude shift keying (ASK) modulation at a rate in the range of 2 to 20 kHz. The wireless IEEE access point 55 executes a communications protocol that is consistent with the IEEE receiver 14, as described above, typically compliant with IEEE 802.11x.

In operation, the remote system 50 is commanded by an operator to communicate with a subset of the vehicles in the assembly yard, typically to communicate information for reprogramming one or more of the electronic control devices. The common message is constructed in the remote system and is broadcasted, using the RKE transmitter 60, to the RKE receivers 12 of all of the vehicles parked in the assembly yard that are within range thereof. The vehicles preferably have the ignition switch turned off. The RKE receivers 12 of each of the vehicles are able to read and interpret the common message, and transmit the common message to an internal processing unit. The internal processing unit compares the content of the common message to individual vehicle information stored therein which has been formatted, typically comprising information related to the VIN and software packages for the control module 20. The internal processing unit determines whether the specific vehicle information conforms to, i.e., matches or falls within, the information in the common message. When the specific vehicle information conforms to the information in the common message, the internal processing unit sends a control message to activate the IEEE receiver 14 to establish a communications link with the wireless IEEE access point 55 of the remote system 50. Otherwise, the internal processing unit shuts off power to the RKE receiver 12. In so doing, a subset of the vehicles is selected based upon the common message. The remote system 50 then transmits a second message to the vehicle via the remote access point and the IEEE receiver 14 comprising formatted electronic data, including, but not limited to, data for reprogramming one or more electronic control devices of the vehicle. The VINs for each of the vehicles so reprogrammed are preferably identified back to the remote system 50, for logging and recordkeeping purposes. Operation of the system is preferably limited to a part of the vehicle life-cycle prior to the vehicle entering into commerce, wherein the described communications link is not activated in response to the common message after the vehicle has logged a minimum in-service operating period, e.g., a minimal number of miles, or elapsed engine operating time, or other criteria. This is accomplished by having the RKE receiver programmed to ignore any common message having correct information in a header of the common message, described hereinafter, after the vehicle has logged the minimum number of miles. However, disablement of the system is not necessarily so limited, as the described communication system may have application for fleet management and at vehicle retail establishments.

The common message comprises the 64 to 128 bit data stream, and has as content a preamble, a header, and, a vehicle data field. The vehicle data field comprises a communications channel, a selection parameter, and a parametric data field that details or describes the specific selection parameter. The preamble preferably includes the initialization data. The header further comprises a plurality of codes which identifies the message and how the related vehicle data field is to be interpreted. In the system and examples described hereinbelow, when the header is H1, the message comprises an RKE message and the vehicle data field is to be interpreted according to an RKE message format. When the header is H2, the message comprises an RKE training message and the vehicle data field is to be interpreted according to a RKE training message format. When the header is H3, the message comprises a tire-pressure monitoring (TPM) message and the vehicle data field is to be interpreted according to a TPM message format. When the header is H4, the message comprises a TPM training message and the vehicle data field is to be interpreted according to a TPM training message format. When the header is H5, the message comprises the common message, e.g., an assembly yard wake-up message, and the vehicle data field is to be interpreted according to the message structure for the common message, as described hereinafter.

The message structure of the vehicle data field for the common message preferably comprises three elements, including the designator for the communications channel for the IEEE receiver 14, the selection parameter type, and the parametric data field. The designator for the communications channel for the IEEE receiver 14 comprises data which selects a common communications channel for the IEEE receiver and the remote IEEE access point 55, and is well understood. The selection parameter type indicates how specific vehicles are to be characterized and classified for selection and de-selection. The vehicles are characterized and classified based upon selection parameters that are readily encoded into one or both of the RKE receiver 12 and the IEEE receiver 14. Exemplary selection parameters comprise: the vehicle identification number (VIN); vehicle model; vehicle powertrain, including e.g., engine configuration and size and transmission type; a control module software version number and update date; and a sequential serial number, e.g., one that is an element of the VIN.

By way of example to illustrate the invention, a list of typical selection parameters is provided in Table 1, below.

TABLE 1

| Type | Selection Parameter |
| --- | --- |
| T1 | Vehicle Identification Number |
| T2 | Vehicle Model |
| T3 | Software (SW) Update Date |
| T4 | SW Version Number |
| T5 | Engine Model/Size |

The parameter data field of the selection parameter type comprises information for selecting a specific vehicle or a specific group of vehicles. Thus the parameter data field comprises individual alpha-numeric characters, or a mixture of alpha-numeric characters and wildcard characters.

A complete common message for communication to a group of vehicles thus preferably includes the following content, structured to be communicated wirelessly in a data stream:
the preamble;
the header, comprising H5, indicating the assembly yard wake-up message, i.e., identifying the incoming message as the common message; and,
the vehicle data field, which comprises:
the communications channel for the IEEE receiver 14;
the selection parameter type (T1-T5); and,
the parametric data field for the selection parameter type.
To illustrate the selection, scenarios are offered as follows.

Scenario 1: When the common message comprises a selection parameter type and parameter data field, i.e., [Type][data] comprising [T1][*******8], then all vehicles having a first VIN digit of 8 are selected and expected to establish the wireless communications link. The symbol '*' is understood to be a wildcard, i.e., any number or symbol contained therein is acceptable.

Scenario 2: When the common message comprises [Type][data] comprising [T3][1/1/06-1/2/06], then all vehicles having a last update date between 1/1/06 and 1/2/06 are selected and expected to establish the wireless communications link.

Scenario 3: When the common message comprises [Type][data] comprising [T3][1/1/06-*****] then all vehicles having a last update date after 1/1/06 are selected and expected to establish the wireless communications link.

Scenario 4: When the common message comprises [Type][data] comprising [T3][*****-1/1/06], then all vehicles having a last update date prior to 1/1/06 are selected and expected to establish the wireless communications link.

Scenario 5: When the common message comprises [Type][data] comprising [T4][v5-v6], then all vehicles having a software version between version 5 and version 6 are selected and expected to establish the wireless communications link. These scenarios are meant to be illustrative, and not exhaustive.

The remote system 50 constructs and broadcasts the common message to all the vehicles within range. The RKE receiver receives the common message, and the RKE receivers for the selected vehicles activate their IEEE receivers 14, enabling them to power up and communicate, preferably through the access point 55 of the remote system 50.

When the IEEE receiver 14 is activated, the remote system 50 communicates with the vehicle by transmitting formatted electronic data to and receiving formatted electronic data from the IEEE receiver 14 via wireless signals transmitted through the wireless access point 55.

The formatted electronic data transmitted between the vehicle and the wireless access point preferably comprise software and calibration modifications for one or more of the electronic control devices of the control module 20, thus effecting remote re-programming thereof. Alternatively, the formatted electronic data comprises features, applications and services including, e.g., navigation information, travel information, entertainment information and files such as music, image and video files. Furthermore, in another embodiment of the system, an additional header can be used, e.g., H6, such that vehicle information is selectively transmitted from the vehicle to the remote system 50 in response to the common message, including, e.g., vehicle operational data and diagnostic trouble codes, to facilitate management of maintenance schedules (e.g., oil changes) and scheduling of repairs.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for selectively communicating from a remote system to a subset of a plurality of vehicles, each vehicle equipped with a first wireless communications receiver and a second wireless communications device comprising:

broadcasting a common message from the remote system to a plurality of vehicles that are shutdown and parked within a predefined geographic location, the common message including a communications channel designator, a selection parameter type, and parametric data corresponding to the selection parameter type;

receiving the common message at each vehicle via the respective first wireless communications receiver;

selecting a subset of the plurality of vehicles comprising activating the second wireless communications device within ones of the plurality of vehicles that have respective vehicle information matching the parametric data corresponding to the selection parameter type for communication with the remote system; and communicating between the remote system and the respective second wireless communications device of each of the vehicles in the selected subset on a communications channel corresponding to the communications channel designator to transmit formatted electronic data therebetween.

2. The method of claim 1, wherein the selection parameter type comprises an element of an ISO standard vehicle identification number.

3. The method of claim 1, wherein the selection parameter type comprises a vehicle model.

4. The method of claim 1, wherein the selection parameter type comprises an engine model.

5. The method of claim 1, wherein the selection parameter type comprises a software version number.

6. The method of claim 1, wherein the selection parameter type comprises a software update date.

7. The method of claim 1, wherein the parametric data for each of the selection parameter types comprises combinations of alphanumeric characters and wildcards.

8. The method of claim 1, wherein the plurality of vehicles is parked in an assembly yard subsequent to vehicle assembly.

9. The method of claim 1, wherein the formatted electronic data comprises data for reprogramming a respective control module of each vehicle in the selected subset of vehicles.

10. The vehicle of claim 1, wherein the first wireless communications receiver comprises a remote keyless entry system.

11. The vehicle of claim 1, wherein activating the second wireless communications device within ones of the plurality of vehicles that have respective vehicle information matching the parametric data corresponding to the selection parameter type for communication with the remote system occurs only within ones of the plurality of vehicles that have not logged a minimum in-service operating period.

12. The method of claim 1, wherein the plurality of vehicles is parked at a vehicle retail establishment.

13. A system, comprising an electronic computing system adapted to selectively wirelessly communicate with a plurality of vehicles during a period when the vehicles are non-operating, comprising:

the electronic computing system, signally connected to a wireless access point and a radio-frequency broadcast transmitter;

the radio-frequency broadcast transmitter adapted to generate and transmit a common message to each of the vehicles;

the electronic computing system adapted to establish a communications link via the wireless access point with a subset of the vehicles; the subset of the vehicles having a selection parameter type and parametric data associated therewith which conform to the contents of the common message;

wherein the common message is an electronic data stream comprising a header and a vehicle data field, wherein the header comprises: a message identifier and a format descriptor for the vehicle data field, a designator for a communications channel for the wireless access point, a selection parameter type, and parametric data associated therewith.

* * * * *